United States Patent Office 3,373,302
Patented Mar. 12, 1968

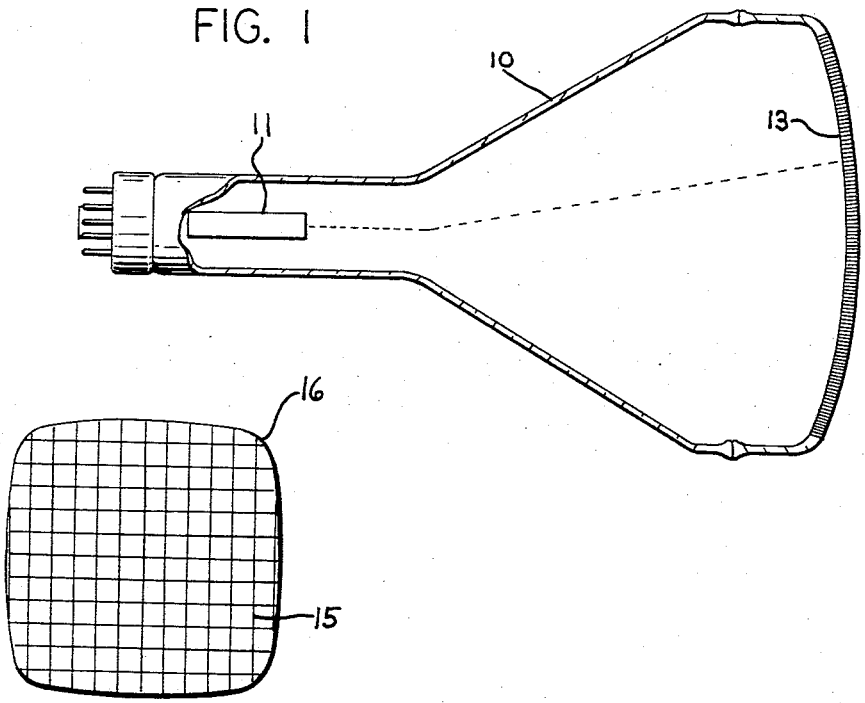
FIG. 1
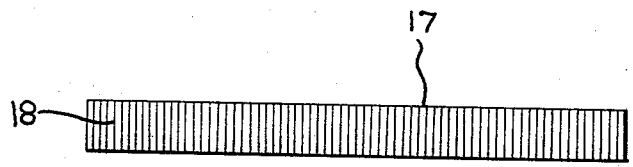
FIG. 2
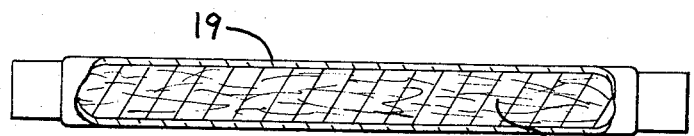
FIG. 3
FIG. 4

3,373,302
CATHODE RAY TUBE DISPLAY SCREEN COMPRISING WOVEN MAT OF LUMINESCENT GLASS FIBERS
Stephen W. Barber, Toledo, Ohio, assignor to Owens-Illinois, Inc., a corporation of Ohio
Filed Dec. 21, 1964, Ser. No. 419,944
1 Claim. (Cl. 313—92)

The present invention relates in general to luminescent devices, and more particularly, to articles that exhibit luminescence under certain conditions of activation including cathodoluminescence when activated by cathode rays and photoluminescence when activated by ultraviolet radiation.

In the past, luminescent devices such as cathode ray tube face plates, fluorescent lighting fixtures, luminescent panels and the like have been prepared employing phosphor materials which are deposited in a coating on the surface of the various objects. When subjected to impingement by specific excitation energy, such as ultraviolet rays, ions and electrons, the phosphor materials respond by emitting light or luminescing. Various difficulties have been encountered in using phosphor coatings including maintaining uniform quality of the phosphor, film adhesion of the phosphor to the substrate, expense of the phosphors as well as other factors which generally detract from the efficiency of this system of lighting. Not only are these phosphor materials generally expensive but careful control is required in the preparation of the coating so as to insure uniformity of light emission.

Accordingly, it is the object of the present invention to provide luminescent devices that avoid the shortcomings and disadvantages of the prior known luminescent devices employing phosphor materials.

It is a further object of the present invention to provide luminescent devices that are free of phosphor materials.

It is a further object of the present invention to provide luminescent devices that luminesce upon activation by specific excitation energy.

It is a further object of the present invention to provide luminescent devices which rely on new concept of lighting that permits greater resolution and definition at a given level of luminosity superior to that obtainable from methods and compositions employed in the past.

In attaining the objects of the present invention, one feature resides in devices containing a multiplicity of individual light conducting glass fibers wherein the glass fibers consist of silica glass containing a luminescence producing substance.

Another feature of the present invention resides in luminescent devices wherein the target for the impingement of the source of excitation energy is formed from a multiplicity of individual light conducting glass fibers consisting of silica glass containing a luminescence producing substance.

Another feature of the present invention resides in luminescent devices containing a target for impingement of excitation energy formed from a multiplicity of individual light conducting glass fibers generally oriented in a connected side by side relation with each other wherein the opposite ends thereof are optically finished and together provide the image receiving and transmitting faces of the luminescent device.

Another feature of the present invention resides in a luminescent device formed of a multiplicity of individual light conducting glass fibers wherein the glass fibers are formed of a core of silica glass containing a luminescence producing substance and an outer relatively thin coating or sheath of a glass free of luminescence producing substances, the glass fibers being connected in a side by side parallel relation with each other and being of essentially uniform cross-section.

Other objects, features and advantages of the present invention will become apparent from the following detailed description thereof taken in conjunction with the drawings wherein:

FIG. 1 is a sectional elevational view of a cathode ray tube embodying the present invention;
FIG. 2 is another embodiment of the present invention in the form of a cathode ray face plate;
FIG. 3 is a sectional view of a luminescent panel of the present invention;
FIG. 4 is a luminescent lighting device of the present invention.

Referring more particularly to the drawings, FIG. 1 illustrates a cathode ray tube such as is employed in most commercially available television systems as well as the general type of structure found in cathode ray tubes of an oscilloscope and similar cathode ray tubes. The body consists of an envelope 10, an electron gun 11, and a face plate 12. The inwardly disposed surface of the face plate forms the target 13 for the electron gun 11. The face plate 12 consists of a multiplicity of glass fibers 14 that are oriented in a side by side parallel relation with each other and wherein the opposite sides thereof are optically finished and together provide the image receiving surface and transmitting surface of the face plate.

FIG. 2 shows another embodiment of the present invention and shows the target surface of a face plate for a cathode ray tube. A multiplicity of glass fibers 15 formed into a grid configuration on the inner surface of the face plate 16.

FIG. 3 shows a luminescent panel 17 wherein the individual light conducting glass fibers 18 are oriented in a parallel side by side relation with each other. Not shown is an alternative embodiment wherein the luminescent panel can be formed of a random mat configuration of glass fibers.

FIG. 4 shows a lighting device comprising a tubular glass envelope 19 fitted with the usual electrical connections and electrode (not shown) containing a multiplicity of the individual light conducting glass fibers 20.

According to the present invention fibers of silica glass doped with certain ions capable of producing luminescence upon activation by excitation energy as for example, ultraviolet light or electron beam activation are used in luminescent devices. The doped glass fibers or "wool" can be inserted into a glass tube or loosely packed in the "face" of a cathode ray tube, for example. Alternatively, the glass fibers can be woven into a mat or fabric which is inserted into the glass envelope. One of the advantages of devices made according to the present invention resides in the fact that greater surface area is exposed to exciting radiation. This factor makes the devices particularly valuable for cathodoluminescence because the electron beam can penetrate only a few millimicrons in depth. Present fluorescent lighting devices relay on the ultraviolet which in turn depends upon the impact of electrons with atoms of mercury vapor in the tube. The glass wool fibers utilized in the devices of the present invention respond with excellent brightness to direct impacts of the electrons and ions. One of the important characteristics of the devices of the present invention resides in the direct excitation by electrons without going through the intermediate step of excitation and fluorescence of mercury vapor.

The silica glass which is the host material for the luminescent producing ions has excellent physical and chemical properties. It is therefore of particular value, when compared to conventional phosphors, because it permits a much more substantial electron beam current to impinge upon the multiplicity of glass fibers forming the target for the electron beam without destroying either the cathodoluminscence output or damaging the target itself. A high current density loading possibility therefore increases the usefulness of the luminescent devices of the present invention.

Moreover, the silica glass has excellent thermal and dimensional stability which is important in high temperature luminescent devices where high resolution and high definition are required and which presented extreme difficulties when using phosphor coated materials of the past.

According to the present invention, individual light conducting glass fibers consisting of silica glass doped with a luminescence producing quantity of a member selected from the group consisting of lanthanum, cerium, praseodymium, neodymium, samarium, europium, gadolinium, terbium, dysprosium, holmium, erbium, thulium, ytterbium, lutetium, have been found to exhibit extremely desirable luminescence properties of strong intensity and over a wide range of excitation. By proper selection of the ions, perfectly transparent glass fibers are obtained that are intensely photoluminescent and cathodoluminescent. The spectral distribution of the light emitted under excitation is highly specific to the particular dopant added. By selection of dopants, emitted light in practically any selected part of the visible spectrum can be obtained. Mixtures of the aforementioned luminescence producing ions incorporated in the silica glass fibers are capable of yielding particularly desirable results. Where more than one dopant is used, the spectral distribution of the light emitted under excitation is highly specific to the specific combinations of dopants.

The doped silica fibers can readily be made and it can be arranged that the fibers consist entirely of doped silica or consist of a central core portion of silica glass containing the luminescence producing materials and a relatively thin outer sheath, coating or cladding of undoped glass; i.e. glass containing no luminescence producing materials.

The particular combination of silica and one or more rare earth ions is particularly advantageous since the silica is stable against a variety of external influences such as temperature, radiation and the like. It has been observed in both photoluminescence and cathodoluminescence that when using a combination of rare earth elements there is in certain cases an unexpected transfer of energy between the luminescence producing materials, in some cases resulting in not only a change in the excitation wave length for a particular rare earth ion, but also the emission of essentially entirely new spectra which are more than the superposition of the spectra of the individual luminescence producing materials.

The glass fibers utilized in the present invention can be excited by ultraviolet radiation, and by electron beams or ion bombardment in the gas discharge.

The glass fibers can be prepared from the silica glass doped with the rare earth oxide by a number of procedures. For example, a refined procedure consists of crushing selected quartz to a size of ranges for close packing which varies from about 4 to 50 millimeters. This material is melted in graphite under a moderate vacuum at about 1850° C. for about 8 hours. If after this treatment small bubbles exist, they can be collapsed by admitting a gas under pressure at this high temperature. When the material appears clear and free of included volatiles, an optically good glass is obtained.

Another process consists of dusting powdered sand onto a molten surface and flaming it in before more is added. A third process consists of burying a carbon electron in sand and heating until a thick envelope of glass forms around the electrode, however, the transparency of the glass tube produced is not particularly good. Moreover, none of the processes would be expected to yield a very homogeneous distribution of the dopant.

A further method is based on the combustion of an organic silane and condensation of the silica vapor onto a molten surface where it immediately fuses.

The preferred method is to employ colloidal $SiO_2$ smoke from an organic silane fire. At this point, water and other combustion products can be removed and the colloid can be doped uniformly by precipitating the dopant material onto the colloid surface.

According to the preferred process, silica particles ranging in size from a few millimicrons up to 100 mesh or larger can be used. The average particle diameters of this material is about 15 to 20 millimicrons with a surface area of about 200 square meters per gram. The material initially contains about 1.7% water, a small part of which is chemically bound and difficult to remove.

To produce the fused silica which is employed in making the glass fibers, it is desirable to first remove the water or the volatiles from the silica colloid. In order to offer an optically good glass, it is important to lower the water bands appearing in the final glass. The loose colloidal silica is fired in air at about 700° C. for several hours which serves to burn out any residual organics and dry off over 90% of the water that is present but the temperatures employed are not sufficient to sinter the particles together or to crystallize the silica. The temperature of the heating is increased to about 1000° for about 2 hours which removes most of the remaining water. If even better quality is desired the heating at 700° and 1000° C. can be done under vacuum. The chemisorbed water is present as silicon bonded hydroxyl groups in the surface of the starting material and hence the Si-OH bindings are surprisingly stable against heat.

The material received after the dehydration step is characterized by being quite voluminous and of a low density. It is therefore mixed with water or other volatile liquid such as alcohol for example, to form a paste that is thin enough to be beaten free of any lumps. The lumps are undesirable since they are apt to sinter faster than the other silica particles and for that reason introduce defects in the final glass. Conveniently, about 10 milliliters of water per gram of silica are used in the forming of the paste.

To the paste is added the luminescence producing material also referred to as the doping ion, which can be in the form of a solution. Preferably, in order to insure that the dopant ion does not migrate during drying so as to become unhomogeneous in its distribution, the luminescence producing ions are precipitated onto the colloidal particles. In the precipitation the rare earth ions are dissolved in nitric acid and precipitated by making the paste slightly alkaline with ammonia. In the precipitation step, it is important to use reagents for the solution so that any unwanted ions such as nitrate and ammonium are expelled in subsequent heating operations.

After the precipitation of the dopant ion, the silica paste is dried at a temperature of at least 100° C. The drying operation yields small particles and agglomerants of silica which are of a greater density than the original material.

The dried paste is next pulverized and thereafter is fired at about 600 to 700° C. for about 30 min. or longer. The firing step removes any volatile salts formed by the precipitation and also burns out dust that might have been introduced in previous steps and removes any residual water that may have been carried through from previous drying steps.

The dried powder is then pressed to the desired shape and then sintered at temperatures of up to about 1200° C. or 1300° C. Thereafter, the material is coalesced in vacuum in order to obtain the transparent glass. Coalescence occurs in 1–3 minutes at 1750° C. or longer times at lower temperatures, such as about 24 hours at 1300° C.

To form the glass fiber, any conventional equipment can be used. For example, the previously prepared glass body in the shape of a rod can be mounted on a lathe head stop spindle and heated with a glass blowing torch while rotating. The torch is mounted on an automatic feed mechanism and carried along the length of the rod. The lathe spindle can be set at any convenient speed and as soon as the flame has softened the end of the rotating glass rod the fiber is started by touching a short piece of quartz to the softened rod. The quantity of fiber produced depends only on the length of the rod used. Any other type of glass fiber drawing mechanism can be used, the only limitation being that the homogeneity of the silica containing the luminescence producing material cannot deleteriously be affected by the drawing process.

In the usual embodiments of the present invention the luminescence producing materials are added to the silica glass in the amount of 5 to 5000 rare earth atoms per million of silica atoms, although the preferred range is 100 to 2000 parts per million.

The time required to effect the glass formation at any given temperature decreases with decreased particle size hence the smaller particle size is preferred. Also homogeneous mixtures of batch components is more assured when the silica particle size is small. Therefore, in the preferred embodiment, silica particle size 10 to 2500 millimicrons is used. In a particularly preferred embodiment silica of a particle size of 10 to 100 millimicrons is employed.

The following tables are illustrative of the various combinations and show the luminescent glass fibers which are employed according to the present invention in the preparation of luminescent devices and articles. The concentrations indicated are in number of dopant atoms per million silica atoms.

TABLE I

| Rare Earths | Glass Color | Concentration: (No. Dope Ions)/ No. of Si | Visible Fluorescence Under Ultraviolet, Room Temperature | |
|---|---|---|---|---|
| | | | 2,537 A. | 3,660 A. |
| La | Colorless | .001 | Wk. green | None. |
| Ce | do | .0005 | Med. bl. grn | Str. bl. white. |
| Pr | Wk. amber | .001 | Str. wine red | None. |
| Sm | | .002 | Wk. dk. red | Med. lt. red. |
| Eu | do | .001 | Str. yel. red | Str. or. yel. |
| Tb | Colorless | .002 | Str. yel. grn | Wk. olive grn. |
| Dy | Wk. yel. amber | .002 | V. wk. orange | Med. orange. |
| Ho | Wk. amber | .0025 | V. wk. yellow | None. |
| Er | Wk. rose pink | .002 | None | Do. |
| Tm | Colorless | .002 | Wk. yellow | Wk. blue green. |
| Yb | do | .002 | V. wk. yellow | None. |
| Lu | do | .002 | Wk. yel. grn | V. wk. green. |

TABLE I-A

| Rare Earths | Glass Color | Concentration: (No. Dope Ions)/ No. of Si | Visible Fluorescence Under Ultraviolet, Room Temperature | |
|---|---|---|---|---|
| | | | 2,537 A. | 3,660 A. |
| La | Colorless | .001 | Wk. yel. green | None. |
| Ce | do | .0005 | Med. lt. green | Str. bl. white. |
| Pr | Wk. amber | .001 | Str. orange | None. |
| Sm | | .002 | V. wk. lt. red | Med. lt. red. |
| Eu | Wk. amber | .001 | Or. and str. yel. | Str. lt. or. |
| Tb | Colorless | .002 | Str. yel. green | Wk. olive green. |
| Dy | Wk. yel. amber | .002 | Med. yel. green | Med. orange |
| Ho | Wk. amber | .0025 | Str. lemon yel | None. |
| Er | Wk. rose pink | .002 | Yel. and pink | Do. |
| Tm | Colorless | .002 | Med. str. yel | Wk. blue green. |
| Yb | do | .002 | Med. str. yel | None. |
| Lu | do | .002 | Med. str. yel | V. wk. green. |

TABLE II

| Dopant | Cathodoluminescence, Intensity and Color | 2,537 A. μv., Intensity and Color | 3,660 A. μv., Intensity and Color |
|---|---|---|---|
| La | Weak dark blue | $SiO_2$* | |
| Ce | Bright light blue | Medium light blue | Bright light blue. |
| Pr | Medium dark red | Medium bright red | |
| Sm | Bright orange | $SiO_2$* | Very weak blood red. |
| Eu | Bright red | Bright red | Medium pink. |
| Gd | | $SiO_2$* (also fluoresces at 3,100 A.) | |
| Tb | Very bright light blue-green. | Bright light green | Very weak blue-green. |
| Dy | Bright light yellow | Weak light yellow | Weak yellow-brown (almost puce). |
| Tm | Medium dark blue | $SiO_2$* | Very, very weak dark blue. |
| Ce-La | Medium light blue | Medium light blue | Bright light blue. |
| Pr-La | Medium dark red (not as bright as Pr alone). | Bright red | |
| Sm-La | Bright red (darker red than Sm alone). | Weak light pink | Weak blood red. |
| Eu-La | Weak orange | Medium light red | Medium pink. |
| Tb-Sm | Medium gray | Bright light green | Weak pink. |
| Dy-Sm | Medium yellow | Medium yellow-brown | Weak yellow-brown. |
| Ho-Sm | Medium orange | $SiO_2$* | Weak red. |
| Er-Sm | do | $SiO_2$* | Do. |
| Tm-Sm | Bright lavender | $SiO_2$* | Do. |
| Yb-Sm | Medium orange | $SiO_2$* | Do. |
| Lu-Sm | do | $SiO_2$* plus pink | Do. |
| Gd-Eu | Medium reddish-purple | Medium light pink | Weak lavender. |
| Tb-Eu | Bright blue-green | Bright light yellow | Bright yellow-green. |
| Dy-Eu | Bright yellow | Medium yellow-orange | Bright light orange. |
| Ho-Eu | Med. reddish-brown | Weak light red | Bright light pink. |
| Er-Eu | do | do | Do. |
| Tm-Eu | Medium purple | do | Bright lt. lav.-pink. |
| Y-bEu | Weak reddish-brown | do | Bright light pink. |
| Lu-Eu | do | Med. whitish-pink | Bright whitish-blue. |
| Tb-Gd | Bright lt. blue-green | Bright light green | Very weak light green. |
| Dy-Gd | Bright yellow | Weak yellow | Very weak yellow-brown. |
| Tm-Gd | | $SiO_2$* | Very weak blue. |
| Dy-Tb | Bright gray | Bright light green | Weak yellow-brown. |

TABLE II—Continued

| Dopant | Cathodoluminescence, Intensity and Color | 2,537 A. μv., Intensity and Color | 3,660 A. μv., Intensity and Color |
| --- | --- | --- | --- |
| Ho-Tb | Medium blue-green | do | Very weak light green. |
| Nd-Pr | Weak violet | Medium light red | |
| Sm-Pr | Medium red | do | Weak blood red. |
| Eu-Pr | do | Medium orange-red | Medium light pink. |
| Gd-Pr | Medium dark red | Medium light red | |
| Tb-Pr | Bright blue-green | Medium bright green | Very weak light green. |
| Dy-Pr | Bright yellow | Medium light red | Weak light yellow-brown. |
| Ho-Pr | Weak red | do | |
| Er-Pr | Weak purple | do | |
| Tm-Pr | Medium purple | do | |
| Yb-Pr | do | do | Very weak blue |
| Lu-Pr | Bright reddish-orange | do | |
| Sm-Nd | do | Weak light blue | Weak blood red. |
| Eu-Nd | Medium bright red | Medium red-orange | Medium light pink. |
| Tb-Nd | Bright blue-green | Medium bright green | Bright light green. |
| Dy-Nd | Bright yellow | Weak light yellow | Weak yellow-brown. |
| Ho-Nd | Very weak blue | $SiO_2$* | Very weak blue. |
| Tm-Nd | Medium dark blue | $SiO_2$* | Medium light pink. |
| Eu-Sm | Bright orange | Medium light red | Very weak red. |
| Gd-Sm | do | Medium light pink | Very weak greenish. |
| Tb-La | Very bright blue-green | Bright light green | Very weak yellow. |
| Dy-La | Bright yellow (not as bright as Dy alone). | Weak light yellow | |
| Tm-La | Medium dark blue | $SiO_2$* | Very weak dark blue. |
| Pr-Ce | Medium blue | Medium light blue | Bright light blue. |
| Nd-Ce | do | do | Do. |
| Sm-Ce | Medium lavender | Medium pink-blue | Bright light lavender. |
| Eu-Ce | Medium lavender (more blue than Sm-Ce). | do | Bright light blue. |
| Gd-Ce | Weak darker blue than Ce alone. | Medium light blue | Bright blue. |
| Tb-Ce | Bright blue-green | Medium bright lt. green | Bright light green. |
| Dy-Ce | Medium whitish | Medium whitish | Bright tea-rose. |
| Ho-Ce | Medium blue (not as bright as Ce alone). | Medium light blue | Bright light blue. |
| Er-Ce | do | do | Do. |
| Tm-Ce | Medium blue | do | Bright light blue. |
| Yb-Ce | Medium dark blue | do | Do. |
| Lu-Ce | Medium blue | do | Bright blue. |
| Er-Tb | Medium blue-green | Bright light green | |
| Tm-Tb | do | do | |
| Yb-Tb | do | do | |
| Lu-Tb | Medium blue-green | do | |
| Ho-Dy | Bright yellow | $SiO_2$* | Weak light yel.-brown. |
| Er-Dy | do | $SiO_2$* | Do. |
| Tm-Dy | Bright white | $SiO_2$* | Do. |
| Yb-Dy | Bright yellow | $SiO_2$* | Do. |
| Lu-Dy | do | $SiO_2$* | Do. |
| Tm-Ho | Medium dark blue | $SiO_2$* | |
| Tm-Er | Dark blue | $SiO_2$* | Weak blue. |
| Yb-Tm | Medium dark blue | $SiO_2$* | Do. |
| Lu-Tm | do | $SiO_2$* | Do. |

* Residual fluorescence in silica.

The above tables are illustrative of the luminescence characteristics that are obtainable from the glass fibers that are employed making the luminescent devices of the present invention.

Examples of luminescent devices that can be made according to the present invention are face plates for cathode ray and oscilloscope tubes of all types, wherein the face plate contains a multiplicity of glass fibers on the inwardly disposed portion of the face plate. Alternatively, the multiplicity of glass fibers can be woven into a grid or fabric and adhered to the face plate. As a third approach, the glass fibers can be oriented in a connected side to side relation with each other and wherein each end of the fiber is optically finished to form the image receiving portion and displaying portion of the face plate. In these applications, the current density and voltage can vary for optimizing the conditions. It is generally desirable to increase the voltage to a higher range to obtain optimum results. The emission of the luminescent devices made according to the present invention are characterized by discrete spectral lines produced by the rare earth dopants rather than broad spectral bands.

Other devices of the present invention include coding apparatus wherein bundles of fibers in a random orientation are employed for making matching screens for sending and receiving coded signals.

The glass fibers transmit ultraviolet in the entire range of from about 4000 A. down to 2000 A. or lower. Ultraviolet excites fluorescence in depth.

When the glass fibers are prepared with a coating or sheath of undoped silica on the outside this silica sheath is no hindrance to fluorescence. However, cathodoluminescence is a surface effect; the electrons cannot penetrate a silica sheath even on fibers of 0.001 inch diameter. Thus, if cathodoluminescence is to be excited through the cylindrical surfaces of the fibers they cannot be sheathed in undoped silica. If excitation is to be at the ends of the fibers only, the sheathing may be desired to enhance light piping.

Luminescent glass fibers placed in a lighting device such as the glass tube or envelope commonly used in fluorescent lighting and excited by direct electron bombardment are very desirable and gave satisfactory results. Moreover, the devices of the present invention are capable of being more efficient in certain parts of the broad range of radiation than are conventional fluorescent lighting devices which rely on phosphor coatings. For example, in a conventional fluorescent tube, the ultraviolet emitted by the bombarded mercury vapor is used to excite the phosphor which then emits the desired light on its outside or surface opposite the side which is actually being bombarded by the exciting ultraviolet energy. Among the advantages in using the luminescent glass fibers in the present invention is the fact that it is unnecessary to coat the tube with a phosphor and that a broader and higher range of energy can be used to excite the luminescent material. Moreover, since there is no coating between the light emitting source and the viewer when luminescent glass fibers are employed, the overall lighting effect is somewhat more efficient in emitting the light produced than is the case when phosphor coated glass envelopes are used.

The electrical devices of the present invention can be made by packing the configuration of individual light conducting glass fibers into the glass envelope and sealing the ends thereof with electrical connections. The glass fibers can be randomly oriented or they can be woven in a predetermined configuration. The tube or envelope contains a source of electron or ion bombardment to supply the excitation energy. Electron guns are a common source of electrons and can readily be employed for purposes of the present invention. Any convenient cathode can be fitted to the envelope to emit electrons. The glass envelope containing the luminescent glass fiber is, of course, under vacuum.

The face plates produced according to the present invention embody a large number of individual light conducting glass fibers which are secured together in a side by side parallel relation with each other. The securing means may take the form of a glass matrix wherein the glass is free of luminescence producing materials. The fibers of the face plates are of substantially uniform cross-sectional area throughout their length and can be formed of a core part of the doped silica glass and an outer relatively thin coating or cladding of undoped silica glass. The fibers can then be fused together to form the face plate. The claddings function to enhance the light piping.

When the fibers are assembled to form the face plate the opposite faces of the face plate can be optically finished by grinding and polishing to render the ends of the fibers readily adaptable to receive and transmit light. If desired the face plate can be formed to a spherical curvature of a radius substantially conforming to a radius of curvature which has been provided on the inner surfaces of conventional solid glass face plates. This radius is controlled in accordance with the distance between the inner face and the electron beam deflection means of kinescopes for reasons which are well-known in television kinescope construction.

Similarly, when forming the luminescent panel of the present invention, the individual light conducting glass fibers consisting of silica glass doped with the luminescence producing ion can be embedded in a matrix of undoped glass or the luminescent panel can be made from a random configuration of the individual glass fibers. The glass fibers possess the properties of transmitting gathered light along their lengths so that their light is emitted from the surface of the panel. Fiber ends therefore act as light points. The glass fibers can be lowered into a mold of molten glass at a temperature below the softening point of the glass fibers so that they will depend in a substantially vertical disposition so that the general vertical disposition of the fiber is maintained. The luminescent material can then be activated, for example, by a concentrated source of ultraviolet light shining on the surface at which all of the fibers terminate. The ultraviolet radiation from the source will be conducted deep into the mass of the panel by the fibers activating the luminescence producing materials. The characteristic spectra of the particular ions will then be emitted from the opposite face of the panel. Such panels can be used as ceiling panels, vertical decorative panels, as well as for various other purposes, which will be readily apparent to those skilled in the art.

It is understood that various other modifications will be apparent to and can readily be made by those skilled in the art without departing from the scope and spirit of this invention. Accordingly, it is not intended that the scope of the claim appended hereto be limited to the description set forth herein but rather that the claims be construed as encompassing all of the features of patentable novelty which reside in the present invention including all features which would be treated as equivalents thereof by those skilled in the art to which this invention pertains.

What is claimed is:

1. A cathode ray tube including an electron gun and a display screen excitable into luminescent emission by electrons from said gun, said display screen comprising a woven mat of substantially transparent, uniformly coalesced, homogeneous, fused glass fibers prepared from a composition consisting essentially of finely divided, anhydrous, particulate, non-crystalline, substantially pure silica and a luminescent producing quantity of at least one member selected from lanthanum, cerium, praseodymium, neodymium, samarium, europium, gadolinium, terbium, dysprosium, holmium, erbium, thulium, ytterbium, and lutetium.

References Cited
UNITED STATES PATENTS

| 2,049,765 | 6/1933 | Fischer | 252—301.4 |
| 2,097,275 | 10/1937 | Fischer | 252—301.4 |
| 2,099,602 | 11/1937 | Fischer | 252—301.4 |
| 2,857,541 | 10/1958 | Etzel et al. | 313—108 |
| 2,983,835 | 5/1961 | Frey | 313—92 X |
| 3,032,657 | 5/1962 | Meier et al. | 250—71 |
| 3,219,585 | 11/1965 | Kaiser | 250—301.4 |
| 3,225,193 | 12/1965 | Hilton et al. | 250—71.5 |
| 3,243,642 | 3/1966 | Gebel | 313—92 X |
| 3,250,722 | 5/1966 | Borchardt | 252—301.4 |

OTHER REFERENCES

Kroger—Some Aspects of the Luminescence of Solids—1948; pp. 51, 52, 296, 298.

Snitzer—Proposed Fiber Cavities for Optical Masers—Journal of Applied Physics; vol. 32, #1; January 1961; pp. 36–39.

ROBERT SEGAL, *Primary Examiner.*

JAMES W. LAWRENCE, *Examiner.*